United States Patent [19]
Sakagami et al.

[11] Patent Number: 5,617,159
[45] Date of Patent: Apr. 1, 1997

[54] IMAGE BLUR SUPPRESSION DEVICE WITH INERTIAL PENDULUM SYSTEM FOR A CAMERA

[75] Inventors: Yasushi Sakagami, Tokyo; Tadao Kai, Kawasaki, both of Japan

[73] Assignee: Nikon Corporation, Tokyo, Japan

[21] Appl. No.: 567,745

[22] Filed: Dec. 5, 1995

[30] Foreign Application Priority Data

Dec. 5, 1994 [JP] Japan ..................... 6-300931

[51] Int. Cl.$^6$ .................................. G03B 39/00
[52] U.S. Cl. .............................. 396/55; 359/557
[58] Field of Search .................. 354/70, 202, 195.1, 354/430; 348/208; 359/554, 555, 556, 557

[56] References Cited

U.S. PATENT DOCUMENTS 5,122,908  6/1992  Sporer .................... 359/557

Primary Examiner—Howard B. Blankenship
Attorney, Agent, or Firm—Staas & Halsey

[57] ABSTRACT

An image blur suppression device suitable for a camera which compensates for low frequency camera motion without increasing the length of the camera in the optical axis direction and without posing limitation on the design of the camera. The image blur suppression device compensates for image blur by damping vibrations of a camera body to a compensation optical system using the inertia of a balance member. An oscillation mechanism unit is equipped with a first rotation member, one end of which is supported by the camera body so that it can rotate freely and the other end of which is fitted with the compensation optical system. A second rotation member is supported by the camera body so that it can rotate freely. The second rotation member has one end fitted to the first rotation member and the balance member attached to the other end.

15 Claims, 2 Drawing Sheets

IMAGE BLUR SUPPRESSION DEVICE WITH INERTIAL PENDULUM SYSTEM FOR A CAMERA

BACKGROUND OF THE INVENTION

1. Field of the Invention

The present invention relates to an image blur suppression device for a camera which compensates for image blur resulting from vibration or motion of an optical device of the camera, and, more particularly, to an image blur suppression device which uses an inertial pendulum system.

2. Description of the Related Art

Image blur suppression devices have as their object, suppression of, or reduction of, blurring in an image projected onto an image plane. The image blur suppression devices set forth herein are motion compensation devices. A motion compensation device is a type of image blur suppression device which compensates for motion incident upon an optical system which projects the image onto the image plane. Motion is typically imparted to the optical system by way of vibrations in the optical system, or in the surrounding holding member. In general, known motion compensation devices cause a compensation lens to shift or tilt counter to the motion of the optical system so as to shift the image projected by the optical system relative to the optical system.

FIG. 3 is a diagram of part of a conventional image blur compensation device having an inertial pendulum system. In FIG. 3, the unit indicated by slanted lines is a camera body 1. In this conventional image blur suppression device, the center of oscillation of a compensation lens group 3 and the center of oscillation of a counter balance 13 are the same. The compensation lens group 3 and the counter balance 13 are attached on opposite sides of the center of oscillation. That is, the compensation lens group 3 is attached at a position of radius $L_m$, with point 0 as the center, and the counter balance 13 is attached to the opposite side so that the counter balance 13 is balanced with the compensation lens group 3. A spring damper system 14 comprises an elastic member 14-1, such as a spring, and a viscous member 14-2, such as a damper. The spring damper system 14 is attached at a distance $L_{kc}$ from the center of rotation 0.

This conventional image blur suppression device inhibits the transmission of vibrations from the camera body 1 to the compensation lens group 3 because the inertia of components such as the counter balance 13 and the compensation lens group 3 works as a low-pass filter. Motion compensation is performed by the compensation lens group 3 using the inertia to maintain the position, prior to any shifting of the camera body 1, of the compensation lens group 3.

The vibration characteristic of the compensation lens group 3, when the camera body 1 has been moved or vibrated, is obtained as the system of forced vibration resulting from displacement excitation, where:

$I_0$: the total moment of inertia of the suppression system $\theta_n$: the angle of motion of the camera body 1

$\theta$: the angle of motion of the compensation lens group 3

When the camera body 1 is considered to vibrate at $\theta_n = \theta_0 \sin(\omega t)$, the equation of motion becomes:

$$I_0 d^2\theta/dt^2 + c L_{kc}^2 d\theta/dt + k L_{kc}^2 \theta = c L_{kc}^2 d\theta_n/dt + k L_{kc}^2 \theta_n$$

Also, the intrinsic angular vibration frequency of this vibration system is:

$$\omega_n = L_{kc}(k/I_0)^{1/2}$$

FIG. 4 is a graph of this convention image blur suppression device which has undergone forced vibration. The vertical axis of FIG. 4 shows the vibration transmission rate M to the compensation lens group 3 when the camera body 1 has been vibrated. The value of the amplitude of vibrations of the compensation lens group 3 divided by the amplitude of vibrations to the camera body 1 is shown by [dB]. The horizontal axis of FIG. 4 is the vibration frequency ratio, which is the ratio ($\omega/\omega_n$) of the angular vibration frequency of the camera body 1 with respect to the intrinsic angular vibration frequency ($\omega_n$) of the conventional image blur suppression device. Camera motion during hand-held photography is mostly due to vibrations within a frequency band of approximately 1[Hz]~15[Hz]. When the value of the transmission rate M is not more than −20[dB], there is little displacement of the compensation lens group 3 due to vibration of the camera body 1, and the image blur suppression device of FIG. 3 performs effective image vibration compensation.

As can be seen in FIG. 4, because the image blur suppression device deals with motion in the low frequency range of the camera, it is necessary to set the fixed frequency of the convention image blur suppression device to a sufficiently low value. To lower the fixed frequency, the following may be done:

(1) Increase the moment of inertia of the compensation lens group 3

(2) Decrease the spring constant of the elastic member

In the first case, as (moment of inertia)=(mass)×(radius of gyration)$^2$, it is advantageous to lengthen the effective radius of gyration.

In the conventional image blur suppression device, to deal with camera motion in the low frequency range, the fixed vibration frequency of the compensation lens group 3 may be lowered, and the moment of inertia of the compensation lens group 3 may be increased. However, to do this, it is necessary to lengthen the radius of oscillation of the compensation lens group 3, which would increase the length of the camera in the optical axis direction. Moreover, even where the radius of oscillation of the compensation lens group 3 is the same, the length, in the optical axis direction, can not be shortened by bringing the center of oscillation closer to the film plane.

Also, the amount of de-centering from the photographic optical axis of the compensation lens group 3 in the conventional image blur suppression device is determined from the positions of the center of rotation of the camera body 1 and the center of oscillation of the compensation lens group 3 to balance the counter balance 13, thereby limiting freedom of design.

SUMMARY OF THE INVENTION

Accordingly, it is an object of the present invention to provide an image blur suppression device which is able to compensate for camera motion in a low frequency range without increasing the length of the camera in the optical axis direction and without limiting the freedom of design.

It is also an object of the present invention to provide an image blur suppression device wherein a center of oscillation of a balance member and a center of oscillation of a compensation optical system are different, so that camera motion in the low frequency range can be compensated without increasing the length of the camera in the optical axis direction.

It is a further object of the present invention to provide an image blur suppression device wherein the position (the height and the distance from the center of the photographic optical axis) of the compensation optical system during image blur compensation can be changed so that the compensation coefficient may be freely adjusted.

Additional objects and advantages of the invention will be set forth in part in the description which follows, and, in part, will be obvious from the description, or may be learned by practice of the invention.

Objects of the present invention are achieved in an image blur suppression device comprising a compensation optical system having a center of oscillation, the compensation optical system compensating for motion by tilting or decentering an optical axis with respect to a photographic optical axis, a balance member having a center of oscillation which differs from the center of oscillation of the compensation optical system, the balance member balancing the compensation optical system, and an oscillation mechanism unit, which supports the compensation optical system and the balance member so that they are able to oscillate, where the inertia of a image blur compensation mechanism unit, which contains at least the balance member and the compensation optical system, operates as a low-pass filter which inhibits transmission of vibrations to the compensation optical system.

Objects of the present invention are also achieved in an image blur suppression device, as set forth above wherein the oscillation mechanism unit comprises a first rotation member having a first and second end, the first end being supported by a fixed unit so as to rotate freely and the second end being fitted to the compensation optical system, and a second rotation member having a first and second end, the second rotation member being supported by the fixed unit so that it can rotate freely, the first end of the second rotation member being fitted with the first rotation member, and the second end of the second rotation member being attached to the balance member.

Objects of the present invention are achieved in an image blur suppression device, as set forth above, wherein at least one of the first rotation member and the second rotation member are supported on the fixed unit by a swivel joint member.

Objects of the present invention are also achieved in an image blur suppression device, as set forth above wherein the first rotation member and the second rotation member are slidably fitted together.

Objects of the present invention are also achieved in an image blur suppression device, as set forth above further comprising a compensation optical system support which supports the compensation optical system and tilts or decenters the optical axis of the compensation optical system with respect to the photographic optical axis.

Objects of the present invention are also achieved in an image blur suppression device, as set forth above wherein the compensation optical system support member is able to oscillate independently in mutually perpendicular directions.

Objects of the present invention are also achieved in an image blur suppression device for use in an optical device having a main optical axis, the image blur suppression device comprising a compensation optical system having an optical axis, the compensation optical system being adapted to have the optical axis moved with respect to the main optical axis, a balance member that balances the compensation optical system such that the balance member and the compensation optical system operate as a low-pass filter with respect to motions transmitted to the compensation optical system, and an oscillation mechanism unit that supports the compensation optical system and the balance member so that they are able to oscillate such that a center of oscillation of the balance member differs from a center of oscillation of the compensation optical system.

Objects of the present invention are also achieved in an image blur suppression device for use in a camera having a main optical axis, the image blur suppression device comprising a compensation optical system having an optical axis, the compensation optical system being adapted to have the optical axis moved with respect to the main optical axis, a balance member that balances the compensation optical system such that the balance member and the compensation optical system operate as a low-pass filter with respect to motions transmitted to the compensation optical system so as to suppress image blur on an image plane of the camera, and an oscillation mechanism unit that supports the compensation optical system and the balance member so that they are able to oscillate such that a center of oscillation of the balance member differs from a center of oscillation of the compensation optical system.

Objects of the present invention are also achieved by an image blur suppression device for use in an optical device having a main optical axis, the image blur suppression device comprising a compensation optical system having an optical axis, the compensation optical system being adapted to have the optical axis moved with respect to the main optical axis, a balance member that balances the compensation optical system, and an oscillation mechanism unit that supports the compensation optical system and the balance member so that they are able to oscillate such that a center of oscillation of the balance member differs from a center of oscillation of the compensation optical system.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENT

Figure 1:
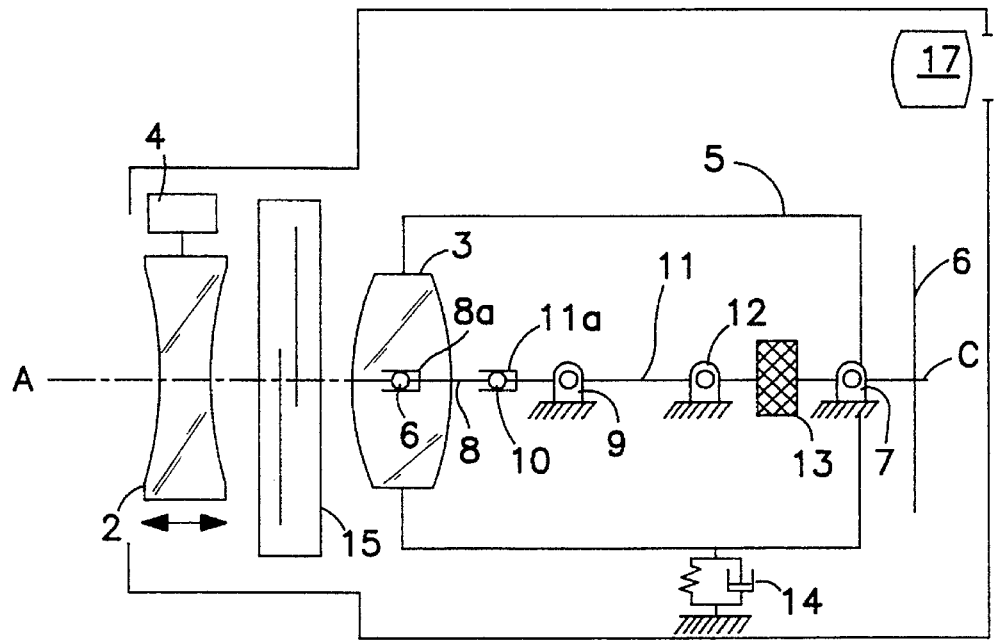
FIG. 1 is a diagram showing an image blur suppression device suitable for a camera in accordance with a preferred embodiment of the present invention.

Reference will now be made in detail to the present preferred embodiments of the present invention, examples of which are illustrated in the accompanying drawings, wherein like reference numerals refer to like elements throughout.

Figure 2:
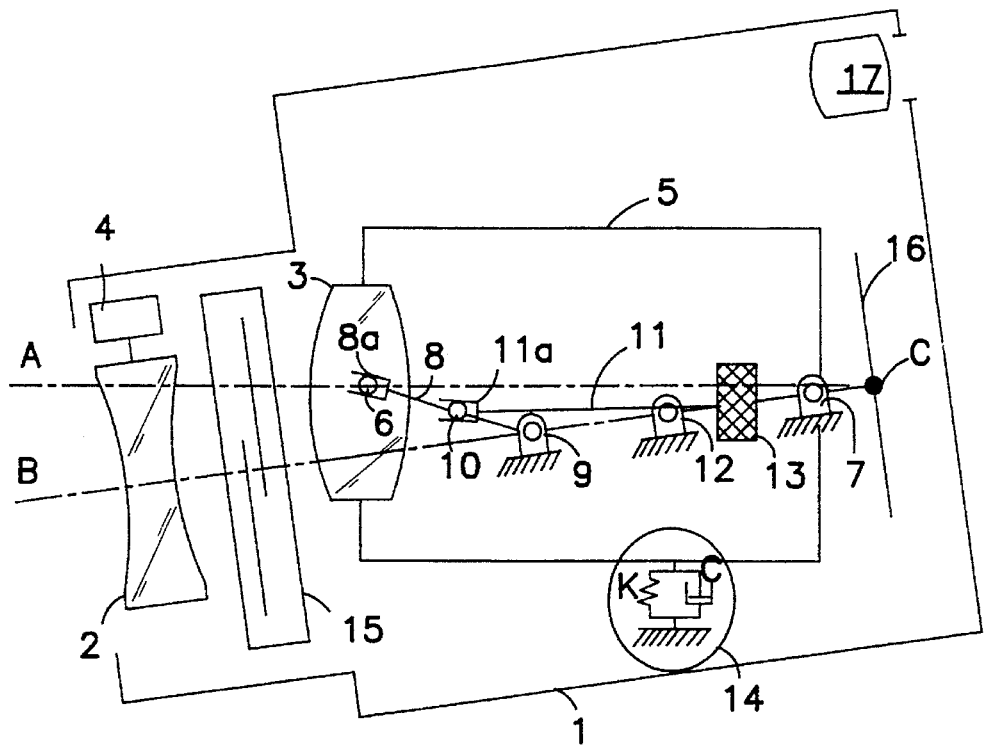
FIG. 2 is a diagram showing the image blur suppression device in accordance with the preferred embodiment of the present invention wherein the camera has moved.
Figure 3:
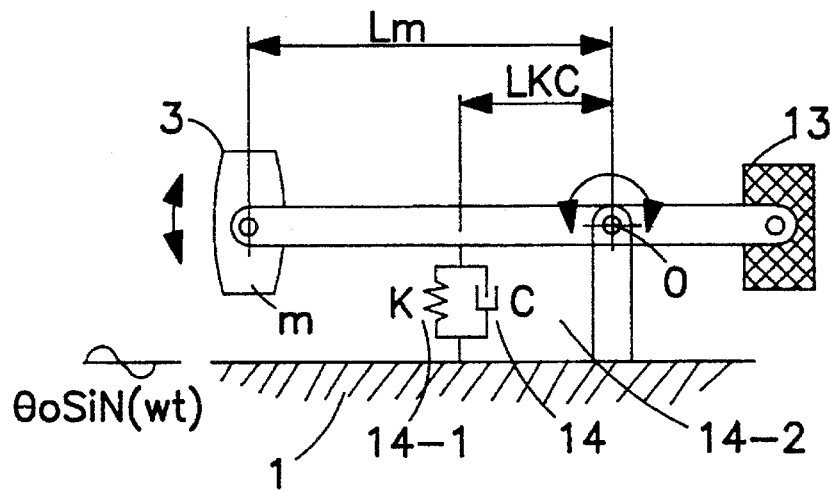
FIG. 3 is a diagram of part of a conventional image blur suppression device having an inertial pendulum system.
Figure 4:
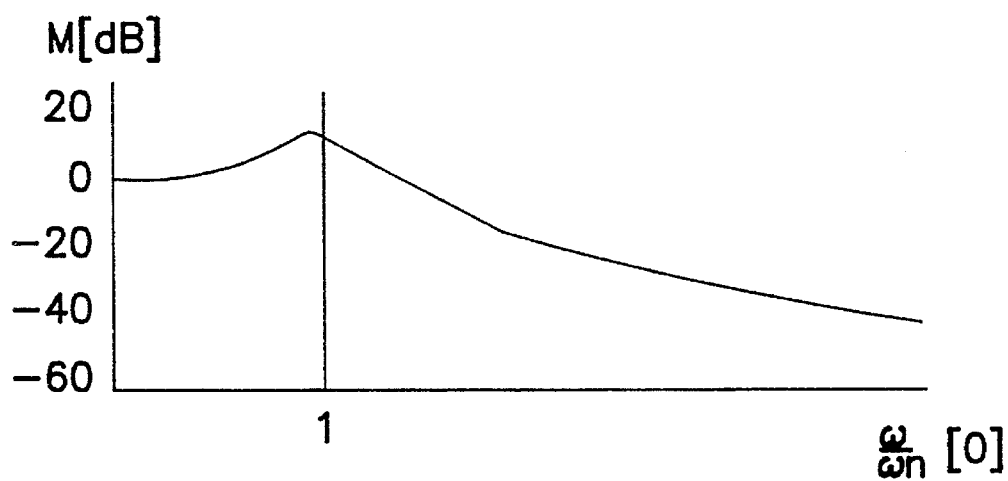
FIG. 4 is a graph of the conventional image blur suppression device of FIG. 3 which has undergone forced vibration.

FIG. 1 is a diagram showing an image blur suppression device particularly suitable for a camera in accordance with a preferred embodiment of the present invention. FIG. 2 is a diagram showing the image blur suppression device in accordance with the preferred embodiment of the present invention wherein the camera has moved. FIGS. 1 and 2 show the image blur suppression device as incorporated in a lens shutter camera. One of ordinary skill in the art will recognize that the image blur suppression device in accordance with the preferred embodiment of the present invention can be adapted for use in other optical systems, such as a single lens reflex camera, video camera, telescope or a rangefinder camera. Further, for purposes of explanation, only the unit which compensates for motion of the camera in the pitch direction is shown and described, but, one skilled in the art will recognize that the unit which compensates for motion in the yaw direction has the same type of mechanism.

The image blur suppression device for a camera body 1, in accordance with the preferred embodiment of the present invention, generally comprises a compensation lens group 3, a compensation lens barrel 5, a first fitting pin 6, a compensation lens barrel support unit 7, a first rotation lever 8, a first rotation lever support unit 9, a second fitting pin 10, a second rotation lever 11, a second rotation lever support unit 12, a counter balance 13, and a spring damper system 14. The photographic lens of the camera comprises the compensation lens group 3 and a focusing lens group 2. The camera body 1 is typically equipped with a shutter device 15, photographic film plane 16, and a viewfinder 17.

The focusing lens group 2 is adapted to be shifted along the optical axis to focus the image. A lens drive device 4 shifts the focusing lens group 2 along the optical axis to perform focusing based on output from an auto-focusing ("AF") device (not shown). The compensation lens group 3 is adapted to oscillate about a point on the optical axis to compensate for vibrations. The compensation lens group 3 compensates for vibrations by moving (by tilting or de-centering) with respect to an photographic optical axis A in response to vibrations or motions in the camera body 1.

The compensation lens barrel 5 supports the compensation lens group 3 and is attached to the camera body 1 by a compensation lens barrel support unit 7. The compensation lens barrel support unit 7 preferably comprises a gimbal support mechanism. The compensation lens barrel support unit 7 oscillates, centering on the compensation lens barrel support unit 7, and tilts or de-centers the compensation lens group 3 from photographic optical axis A.

The first rotation lever support unit 9 is attached in the general vicinity of the optical axis of the camera body 1. The first rotation lever support unit 9 preferably comprises a universal joint which rotatably supports the first rotation lever 8. One end of the first rotation lever 8 is rotatably attached to the first rotation lever support unit 9, while the other end 8a slidably fits with the first fitting pin 6, which is embedded in the compensation lens barrel 5. The end 8a may also be fit with the compensation lens 3. A second fitting pin 10, which fits with the second rotation lever 11, is slidably attached on the first rotation lever 8.

The second rotation lever support unit 12 is attached in the general vicinity of the optical axis of the camera body 1. The second rotation lever support unit 12 preferably comprises a universal joint which rotatably supports the second rotation lever 11. The second rotation lever 11 is rotatably attached to the second rotation lever support unit 12, and has one end 11a which fits with the second fitting pin 10. The second fitting pin is slidably attached to the first rotation lever 8. The other end of the second rotation lever 11 is attached to a counter balance 13.

As shown in FIG. 1, when the camera is level, the optical axis of the compensation lens group 3 matches the photographic optical axis. FIG. 2 shows a situation where the camera has rotated in a counterclockwise direction (as seen in FIG. 2) at a certain angle centering on the point of intersection C (center of the film) of the photographic optical axis A and the photographic film plane 16.

Normally, the photographer performs photography while looking through the viewfinder 17, such that the viewfinder 17 of the camera comes into contact with the photographer's face and has little movement. Therefore, camera motion centers around a point is the vicinity of the viewfinder 17. Thus, the center of rotation C of the camera body 1 may be assumed to be the center of the film plane.

The counter balance 13 is balanced with the compensation lens group 3 (more precisely, with the entire image blur suppression device). That is, the force relating to the rotation of the compensation lens group 3 is exerted on the end of the counter balance 13, on the opposite side of the second rotation lever 11. Therefore, even when the camera body 1 has moved, the second rotation lever 11 remains level through inertia. The first rotation lever 8 is raised from photographic optical axis B by the second fitting pin 10, which fits with the second rotation lever 11, and the first rotation lever 8 rotates in a clockwise direction until the second rotation lever 11 becomes approximately level. When the first rotation lever 8 rotates in a clockwise direction, the compensation lens barrel 5 also rotates with the compensation lens group 3 in the clockwise direction by means of the first fitting pin 6. In this way, vibrations are compensated for by the compensation lens group 3 tilting from the photographic optical axis in response to camera motion. In contrast to the prior art, the image blur suppression device in accordance with the preferred embodiment of the present embodiment is able to arrange a counter balance 13 closer to the compensation lens group 3 than the center of oscillation 7 of the compensation lens group 3. Thus, the length of camera in the optical axis direction can be reduced.

The distance from the center of rotation of the second rotation lever 11 to the fitting position with the second fitting pin 10 and the distance from the center of rotation of the first rotation lever 8 to the first fitting pin 6 change in conjunction with the tilt operation of the compensation lens group 3. However, the angle of motion of the camera in the actual image blur compensation operation is a slight angle (approximately ±2°~3°), so such changes do not have a great influence on the balance relationship of the image blur suppression device.

Also, by changing the length from the center of rotation of the first rotation lever 8 to the fitting unit with the first fitting pin 6 and changing the attachment position of the second fitting pin 10 attached on the first rotation lever 8, it is possible to change the position (height) of the compensation lens group 3 during image blur compensation. This increases the degree of freedom of lens design. Specifically, by changing the amount of shift of the compensation lens group 3 and selecting the ratio (the compensation coefficient) of the amount of shift of the image on the film plane to the amount of shift of that compensation lens group 3, the lens power selection range is broadened.

Although the first embodiment of the present invention has been described with respect to a specific configuration, it will be recognized that the first embodiment is not limited to the specific configuration. For example, the compensation lens group 3 is described as performing image blur compensation by oscillating around a point on its optical axis and tilting from the photographic optical axis, but the compensation lens group 3 may also be shifted or otherwise moved (for example, de-centered) approximately perpendicular to the photographic optical axis to perform image blur compensation. Moreover, the swivel joint member was explained using the example of a universal joint, but may also compare a ball joint. Further, a spring and damper may be arranged on the support shaft of the compensation lens barrel support unit so that they are able to oscillate independently in the pitch direction and yaw direction. In this case, it is possible to use a torsion spring, coil spring, or flat spring as the elastic member, and it is possible to use rubber members such as an oil damper, air damper, damping rubber, or silicon rubber as the damper. Moreover, it is possible to use a damping steel plate which has the characteristics of both an elastic member and a viscous member.

Although a few of the preferred embodiments have been shown and described, it would be appreciated by those skilled in the art that changes may be made in these embodiments without departing from the principles and spirit of the invention, the scope of which is defined in the claims and their equivalents. Further, one of ordinary skill in the art will recognize that while the preferred embodiments have been shown and described as being used within an optical camera, they may be adapted for use in any device in which it is desirable to suppress blurring of an image formed by an optical system, for example, in camcorders, motion picture cameras, telescopes, binoculars, microscopes, range finding equipment, lasers, fiber optic communication systems, various optical projection systems and CD mastering systems.

In accordance with the preferred embodiment of the present invention, the center of oscillation of the balance member and the center of oscillation of the compensation optical system are different, so that camera motion or vibration in the low frequency range can be compensated for without increasing the length of the camera in the optical axis direction. Further, the position (the height and the amount of de-centering from the photographic optical axis) of the compensation optical system during image blur compensation can be changed, allowing the compensation coefficient to be freely set, thereby increasing the degree of freedom in lens design.

What is claimed is:

1. An image blur suppression device for use in an optical device having a main optical axis, the image blur suppression device comprising:

a compensation optical system having an optical axis, the compensation optical system being adapted to have the optical axis moved with respect to the main optical axis;

a balance member that balances said compensation optical system such that said balance member and said compensation optical system operate as a low-pass filter with respect to motions transmitted to said compensation optical system; and an oscillation mechanism unit that supports said compensation optical system and said balance member so that they are able to oscillate such that a center of oscillation of said balance member differs from a center of oscillation of said compensation optical system.

2. An image blur suppression device, as set forth in claim 1, wherein the oscillation mechanism unit comprises:

a first rotation member having a first end rotatably supported by a fixed unit and a second end fitted to said compensation optical system; and a second rotation member rotatably supported by the fixed unit, said second rotation member having a first end fitted to the first rotation member and a second end attached to said balance member.

3. An image blur suppression device, as set forth in claim 2, wherein at least one of said first rotation member and said second rotation member are supported by the fixed unit by a swivel joint member.

4. An image blur suppression device, as set forth in claim 2, wherein said first rotation member and said second rotation member are slidably fitted together.

5. An image blur suppression device, as set forth in claim 3, wherein said first rotation member and said second rotation member are slidably fitted together.

6. An image blur suppression device, as set forth in claim 1, further comprising a compensation optical system support unit that supports said compensation optical system and tilts the optical axis of said compensation optical system with respect to the main optical axis.

7. An image blur suppression device, as set forth in claim 1, further comprising a compensation optical system support unit that supports said compensation optical system and de-centers the optical axis of said compensation optical system with respect to the main optical axis.

8. An image blur suppression device, as set forth in claim 2, further comprising a compensation optical system support unit that supports said compensation optical system and tilts the optical axis of said compensation optical system with respect to the main optical axis.

9. An image blur suppression device, as set forth in claim 2, further comprising a compensation optical system support unit that supports said compensation optical system and de-centers the optical axis of said compensation optical system with respect to the main optical axis.

10. An image blur suppression device, as set forth in claim 6, wherein said compensation optical system support unit is able to oscillate independently in mutually perpendicular directions.

11. An image blur suppression device, as set forth in claim 7, wherein said compensation optical system support unit is able to oscillate independently in mutually perpendicular directions.

12. An image blur suppression device for use in a camera having a main optical axis, the image blur suppression device comprising:

a compensation optical system having an optical axis, the compensation optical system being adapted to have the optical axis moved with respect to the main optical axis;

a balance member that balances the compensation optical system such that said balance member and said compensation optical system operate as a low-pass filter with respect to motions transmitted to said compensation optical system so as to suppress image blur on an image plane of the camera; and an oscillation mechanism unit that supports said compensation optical system and said balance member so that they are able to oscillate such that a center of oscillation of said balance member differs from a center of oscillation of said compensation optical system.

13. An image blur suppression device, as set forth in claim 12, wherein the oscillation mechanism unit comprises:

a fixed unit;

a first rotation member having a first end rotatably supported by said fixed unit and a second end fitted to said compensation optical system; and a second rotation member rotatably supported by said fixed unit, said second rotation member having a first end fitted to said first rotation member and a second end attached to said balance member.

14. An image blur suppression device for use in an optical device having a main optical axis, the image blur suppression device comprising:

a compensation optical system having an optical axis, the compensation optical system being adapted to have the optical axis moved with respect to the main optical axis;

a balance member that balances said compensation optical system; and an oscillation mechanism unit that supports said compensation optical system and said balance member so that they are able to oscillate such that a center of oscillation of said balance member differs from a center of oscillation of said compensation optical system.

15. An image blur suppression device, as set forth in claim 14, wherein the compensation optical system forms a convex lens.

* * * * *